Feb. 21, 1950　　　W. K. CRESON　　　2,497,930
TRANSMISSION CONTROL
Filed April 2, 1948　　　3 Sheets-Sheet 1
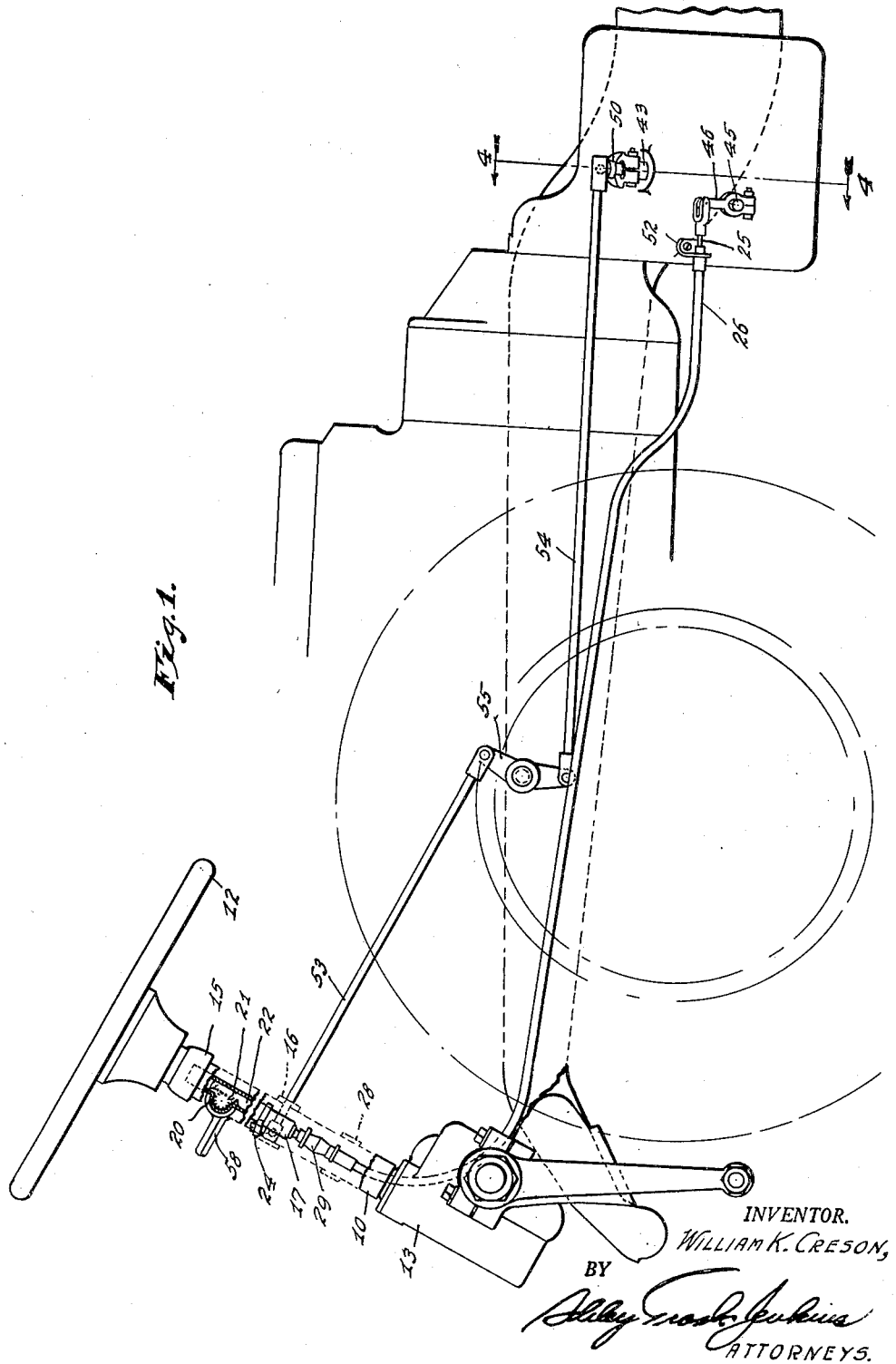
INVENTOR.
WILLIAM K. CRESON,
BY
ATTORNEYS.

Feb. 21, 1950 — W. K. CRESON — 2,497,930
TRANSMISSION CONTROL
Filed April 2, 1948 — 3 Sheets-Sheet 2
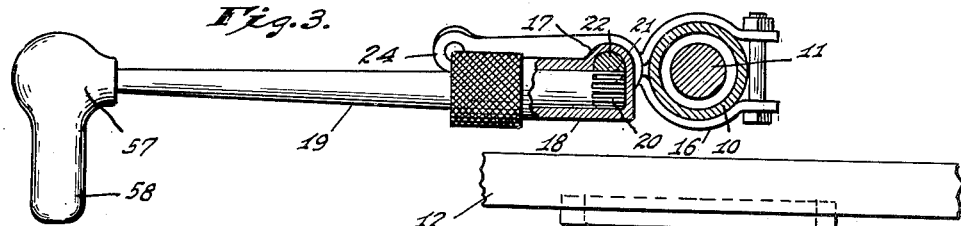
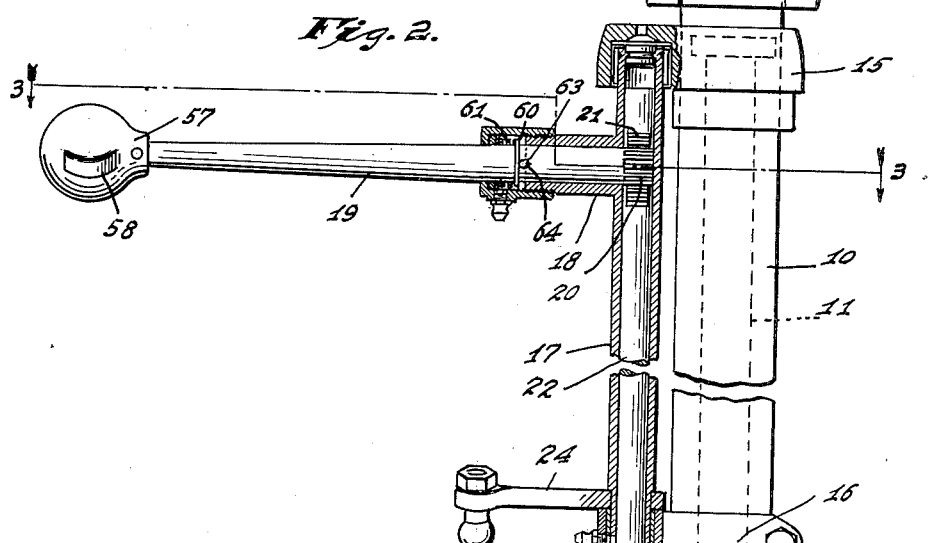
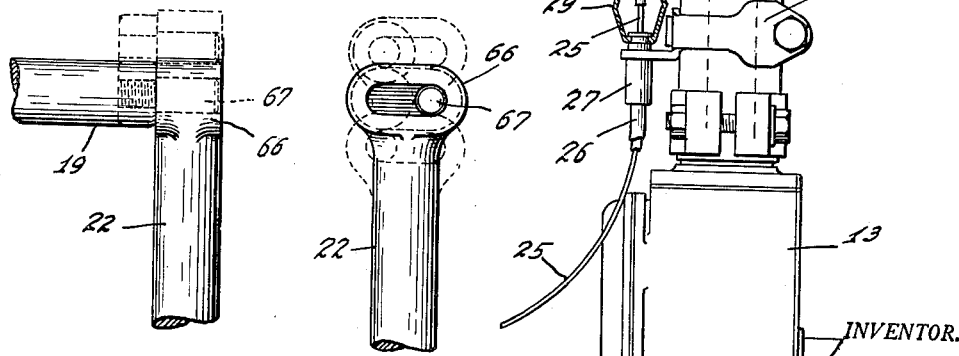
INVENTOR.
WILLIAM K. CRESON,
BY
ATTORNEYS.

Feb. 21, 1950   W. K. CRESON   2,497,930
TRANSMISSION CONTROL
Filed April 2, 1948   3 Sheets-Sheet 3
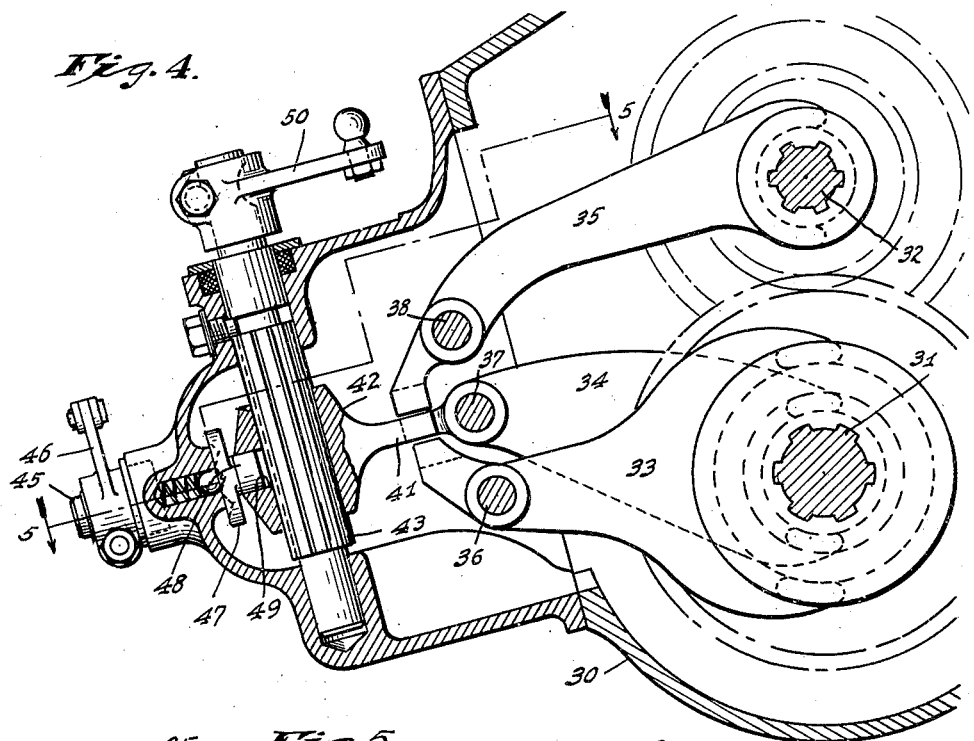
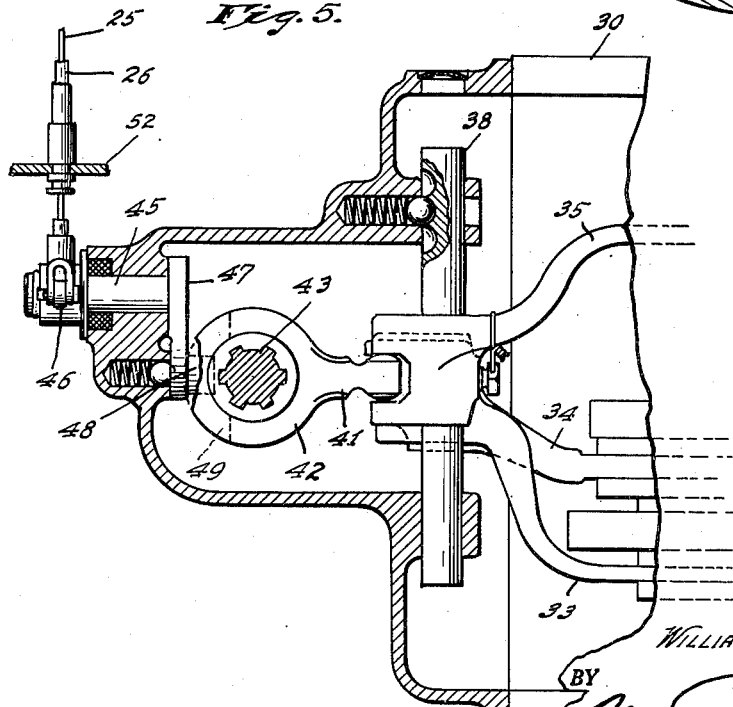
INVENTOR.
WILLIAM K. CRESON,
BY
ATTORNEYS.

Patented Feb. 21, 1950

2,497,930

UNITED STATES PATENT OFFICE 2,497,930

TRANSMISSION CONTROL

William K. Creson, La Fayette, Ind., assignor to Ross Gear & Tool Company, La Fayette, Ind., a corporation of Indiana Application April 2, 1948, Serial No. 18,580

5 Claims. (Cl. 74—473)

This invention relates to control mechanism for selecting the speed ratios to be provided by a selective change-speed transmission mechanism embodied in an automotive vehicle. Such change-speed transmissions commonly embody two or more sets of sliding gears or clutch elements which can be selectively moved in either direction axially of themselves to provide different speed ratios between driving and driven shafts. Commonly, such transmission mechanisms are controlled by a single control member having two degrees of freedom of movement, providing respectively for the selection of the gear-set or clutch element to be shifted and for the subsequent shifting of the selected gear-set or element in one direction or the other.

It is the object of my invention to produce an improved transmission-control device of the general type just described. Another object of my invention is to produce a transmission-control device which will be adapted for mounting on the steering post of an automotive vehicle. A further object of my invention is to reduce the possibility of error or confusion in selecting the gear-set or clutch element of the transmission which is to be shifted. Still another object of my invention is to produce a transmission-control mechanism which can be simply and economically manufactured and which will possess flexibility of installation and adaptability for use in different vehicles.

My invention is especially suited for use in connection with a transmission-mechanism which itself includes a pair of operating members, one movable to select the gear-set or clutch element to be shifted and the other movable to effect the desired shifting. In incorporating my invention in its preferred form in association with such a transmission, I mount on and generally parallel to the steering column of the vehicle a hollow shaft within which an axially slidable rod is received. Projecting laterally from the hollow shaft and supported therefrom for rotation about its own axis is a control arm operatively connected to the rod in such a way that rotation of the control arm will produce axial movement of the rod. Such rod is operatively connected through a Bowden wire with that operating member of the transmission mechanism which selects the transmission-element to be shifted, while the hollow shaft is provided near its lower end with a laterally projecting arm operatively connected to the operating member which effects axial movement of the shiftable elements. The outer end of the control rod is provided with a non-circular head whose angular disposition about the axis of the control rod positively indicates the shiftable element which is selected for movement.

The accompanying drawings illustrate my invention: Fig. 1 is a somewhat diagrammatic, fragmental, side elevation of an automotive vehicle equipped with my transmission control; Fig. 2 is a front elevation in partial section of the steering column showing the transmission control in section; Fig. 3 is a section on the line 3—3 of Fig. 2; Fig. 4 is a section on the line 4—4 of Fig. 1 showing one form of transmission mechanism adapted for control by my invention; Fig. 5 is a section on the line 5—5 of Fig. 4; Fig. 6 is a fragmental view similar to Fig. 2 but showing a modified construction; and Fig. 7 is an elevation of the parts shown in Fig. 6.

The structure illustrated in the drawing comprises a hollow steering post 10 through which there extends a steering shaft 11 carrying the conventional steering wheel 12 at its upper end. The lower end of the steering post 10 is connected to the housing 13 of any desired form of steering gear to be operated by rotation of the steering wheel 12 and shaft 11. Details of the steering mechanism form no part of this invention.

In embodying my improved transmission-control mechanism in association with the steering post 10, I provide adjacent the upper and lower ends of such steering post a pair of brackets 15 and 16 which rotatably receive a hollow shaft 17 extending generally parallel to the steering post. Near its upper end the shaft 17 is provided with a laterally projecting boss 18 which rotatably receives a control arm 19 offset forwardly from the axis of the shaft 17 and provided at its inner end with gear teeth 20 meshing with rack teeth 21 on a rod 22 which is axially slidable within the shaft 17. Near its lower end, the shaft 17 is provided with a rigid arm 24 through which the shaft is connected to the transmission mechanism. The rod 22 projects downwardly below the lower end of the shaft 17 and has connected to it a Bowden wire 25 extending through a flexible sheath 26 to the transmission mechanism. The sheath 26 is fixed to the steering post 10, as through the medium of a sleeve 27 and bracket 28. If desired, the exposed end of the Bowden wire may be protected by enclosing it within a sleeve 29 which is formed of soft rubber or other flexible material and has its ends secured respectively to the rod 22 and the sleeve 27.

It will be obvious from the construction just described that the control arm 19 can be rotated about its own axis to cause axial movement of the rod 22 and movement of the Bowden wire 25 within its sheath 26, or swung about the axis of the shaft 17 to rock such shaft and the arm 24 fixed thereto.

One form of transmission mechanism suitable for control by the device above described is illustrated in Figs. 4 and 5. Such transmission mechanism comprises a casing or housing 30 containing appropriate gears, including sliding gears mounted on shafts 31 and 32 and axially shiftable by shifter forks 33, 34 and 35 fixed on slidable shift rails 36, 37, and 38. The shifter forks 33, 34, and 35 have bifurcated ends which are juxtaposed in position to receive selectively the outer end of an arm 41 on a fork-shifter 42. Such fork-shifter is slidably mounted on but rotatable with a shaft 43 disposed in a plane perpendicular to the shift rails, so that by movement of the shifter 42 along the shaft 43 the arm thereon can be brought into the bifurcated end of any one of the shifter forks 33, 34, and 35, and by subsequent rotation of the shaft 43 the engaged shifter fork can be moved to shift its associated gear-set axially and effect the desired speed-change.

Mechanism for controlling the axial position of the fork-shifter 42 along the shaft 43 comprises a rock-shaft 45 mounted in the transmission-casing 30 on an axis disposed in a plane normal to the axis of the shaft 43. The shaft 45 projects through the wall of the housing 30, and is provided at its outer and inner ends, respectively, with rigid arms 46 and 47. The latter arm carries near its outer end a roller 48 which is received within a transverse groove 49 in the shifter 42, so that by rocking the shaft 45 the shifter 42 may be moved axially along the shaft 43. The shaft 43 projects upwardly through the wall of the transmission housing 30 and has secured to its outer end an arm 50.

The transmission described above is referred to herein merely as an example of one form of transmission with which my invention is adapted to co-operate; for my control apparatus can be employed with any transmission which embodies a plurality of elements which are selectively shiftable to control the speed-ratio which the transmission provides.

In connecting my control mechanism with the operating arms 46 and 50 of the transmission just described, the arm 24 on the shaft 17 is connected to the arm 50 and the Bowden wire 25 to the arm 46, the Bowden-wire sheath 26 being conducted to a point adjacent the outer end of the arm 46 where it is anchored to the transmission housing 30 as through the medium of a bracket 52. In the specific arrangement shown in the drawing, the arms 24 and 50 are respectively connected to limbs 53 and 54 which are themselves interconnected by a motion-reversing lever 55. It will of course be understood that the precise form of mechanism employed to interconnect the arms 24 and 50, will vary as necessary to suit the spatial relationship of such arms and the desired relation between rotation of the shaft 17 and movement of the shifter forks.

The control rod 19 has an intermediate and two extreme positions of adjustment about its own axis and an intermediate and two extreme positions of adjustment about the axis of the shaft 17. When the control rod is in the intermediate positions, with respect to both such axes, the parts occupy the positions shown in the drawings, the fork-shifter 42 being in its intermediate position of adjustment along the shaft 43 and in engagement with the intermediate shifter-fork 34. Rotation of the control rod 19 about its axis in one direction will move the rod 22, Bowden wire 25, and rock-shaft 45 to cause the arm 41 on the fork-shifter 42 to engage the shifter-fork 33, while rotation of the control rod 19 in the opposite direction will move the arm 41 into engagement with the shifter-fork 35. When the arm 41 has been brought into engagement with the desired shifter-fork by rotation of the rod 19 about its own axis, such control rod is then moved either forwardly or rearwardly to rock the shaft 17. Movement of the shaft 17 is transmitted through the arm 24, links 53 and 54, lever 55, and arm 50 to the shaft 43, which rocks the engaged shifter-fork in one direction or the other to effect the desired change in speed ratio.

In order that the operator may be aware of which shifter-fork is engaged by the arm 41 on the shifter 42, the control rod 19 is provided at its outer end with a handle 57 which is non-circular in shape. As shown, the handle is generally spherical but is provided with a finger or extension 58 whose presence enables the operator to readily determine the position of the control rod 19 about its axis and hence the position of the shifter 42 along the shaft 43. As shown, the finger 58 projects forwardly, so that when the handle is rotated to move the finger 58 downwardly, the rod 22 will be raised and the shaft 45 rocked to raise the shifter 42 on the shaft 43 until the arm 41 engages the upper shifter-fork 35. If the control rod 19 is rotated to cause upward movement of the finger 58, the rod 22 will be lowered and the shifter 42 will be lowered to bring the arm 41 into engagement with the shifter 33.

If desired, I may associate with the rod 19 detent mechanism capable of functioning to indicate to the operator when the rod 19 is in its intermediate position of adjustment about its own axis. To this end, the control rod 19 is provided with a shoulder 60 adapted to be engaged by one end of a compression spring 61 the other end of which reacts against the base of a cap screw-threadedly mounted on the boss 18; and the rod 19 is additionally provided with a transverse pin 63 adapted to be seated in a notch 64 in the outer end of the boss 18. The pin 63 and notch 64 are so angularly disposed that when the pin is seated in the notch the control rod 19 will be in its intermediate position of adjustment about its own axis. The spring 61 urges the rod 19 inwardly, causing the pin 63 to enter the notch 64 whenever it is in alignment therewith. When the pin is in engagement with the notch, rotation of the rod 19 will involve compression of the spring 61, and the effort to effect such compression will be evident to the operator. Thus, the operator can readily determine when the rod is in its neutral position about its own axis.

In its broader aspects, my invention is not limited to any of the specific details illustrated in the drawings, and more particularly is not limited to the specific means employed to convert rotation of the control arm 19 about its own axis into longitudinal movement of the rod 22. In Figs. 6 and 7, I have illustrated one of a number of alternative methods of interconnecting the control arm 19 and the rod 22. In the arrangement there shown, the upper end of the rod 22 is provided with a transversely slotted yoke 66 which receives a pin 67 eccentrically mounted on the inner end of the control rod 19. In the intermediate position of the control rod 19, the common plane of the axes of the control rod and the pin 67 lies generally normal to the rod 22, so that such rod can be moved in either direction by appropriate rotation of the control rod.

In order that the angular disposition of the finger 58 may be a ready and effective indication, both to the sight and touch of the operator, of the vertical position of the rod 22 and hence of the disposition of the fork-shifter 42, I prefer that a substantial rotation of the control rod be necessary in order to move the fork-shifter 42 from one shifter-fork to another. In actual commercial applications which I have made, substantially 90° of rotation of the control rod 19 from its intermediate position is necessary to move the fork-shifter arm 41 out of engagement with the shifter-fork 34 and into engagement with either of the forks 33 and 35. In such an arrangement, when the control rod 19 is in any of its controlling positions of relative adjustment, the finger 58 will extend either generally forwardly, generally upwardly, or generally downwardly; and there is so much difference between any two of such finger-positions that confusion or error in respect to relative adjustment of the control rod is practically impossible. While I prefer to so proportion the parts that approximately 90° of control-rod rotation is necessary to move the rod from one controlling position to the next, substantial benefits are obtained with a construction in which a lesser extent of rotation is required.

I claim as my invention:

1. Control mechanism for a change speed transmission having a plurality of elements selectively shiftable to provide different speed ratios, a shifter-fork for each element, and a fork shifter selectively engageable with said forks and movable to shift the engaged fork; said control mechanism comprising a hollow rock shaft, a control rod projecting laterally from said shaft and supported therefrom for rotation with the shaft about the shaft-axis and for rotation about its own axis relatively to the shaft, a rod axially slidable within said shaft, and means operatively interconnecting said control rod and slidable rod to produce axial movement of the latter upon rotation of the former, said slidable rod being adapted for connection to mechanism controlling engagement of the fork-shifter with the shifter-forks and said shaft being adapted for connection with the fork-shifter to move it in a fork-shifting direction.

2. The invention set forth in claim 1 with the addition of a handle on said control rod asymmetric with respect to the axis of control-rod rotation.

3. The invention set forth in claim 1 with the addition that said transmission is embodied in the driving mechanism of an automotive vehicle having a steering post, said shaft being supported from and generally parallel to said steering post.

4. The invention set forth in claim 1 with the addition that said interconnecting means comprises gear teeth on said control rod and meshing rack teeth on said slidable rod.

5. In combination with a change-speed transmission mechanism having elements shiftable to effect speed-changes, a hollow rock shaft, a control member projecting laterally from said shaft and supported therefrom for rotation with the shaft about the shaft-axis and for rotation about its own axis relatively to the shaft, an axially slidable rod within said rock shaft, means interconnecting said control member and rod for moving the latter axially when the former is rotated, a Bowden wire connected to said rod to be moved thereby, and transmission-element shifting mechanism connected to said shaft for operation thereby, said mechanism including selecting means controlled by said Bowden wire for selectively connecting said mechanism to any of said transmission-elements.

WILLIAM K. CRESON.

REFERENCES CITED

The following references are of record in the file of this patent:

UNITED STATES PATENTS

| Number | Name | Date |
|---|---|---|
| 648,059 | Sutch | Apr. 24, 1900 |
| 946,465 | Schmidt | Jan. 11, 1910 |
| 1,416,672 | Asprooth | May 23, 1922 |
| 1,830,797 | Lapsley | Nov. 10, 1931 |
| 1,992,419 | Girardi | Feb. 26, 1935 |
| 2,280,047 | Nampa | Apr. 14, 1942 |

FOREIGN PATENTS

| Number | Country | Date |
|---|---|---|
| 300,014 | Great Britain | Nov. 8, 1928 |
| 863,385 | France | Mar. 31, 1941 |